(12) United States Patent
Obata et al.

(10) Patent No.: US 6,925,306 B2
(45) Date of Patent: Aug. 2, 2005

(54) BASE STATION AND RADIO RESOURCE ALLOCATION METHOD

(75) Inventors: Kazunori Obata, Yokosuka (JP); Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 324 days.

(21) Appl. No.: 10/361,648

(22) Filed: Feb. 11, 2003

(65) Prior Publication Data

US 2003/0157941 A1 Aug. 21, 2003

(30) Foreign Application Priority Data

Feb. 12, 2002 (JP) .................................. P2002-034271

(51) Int. Cl.$^7$ ............................................. H04Q 7/20
(52) U.S. Cl. ................... 455/453; 455/405; 455/452.1; 370/230
(58) Field of Search ................................ 455/405, 453, 455/452.1, 450, 426.1; 370/229, 230, 234

(56) References Cited

U.S. PATENT DOCUMENTS

| | | | |
|---|---|---|---|
| 4,670,899 A | * 6/1987 | Brody et al. | ................. 455/453 |
| 5,666,356 A | * 9/1997 | Fleming et al. | ............. 370/328 |
| 5,790,955 A | * 8/1998 | Tomoike | ...................... 455/453 |
| 5,859,838 A | * 1/1999 | Soliman | ...................... 370/249 |
| 6,240,287 B1 | * 5/2001 | Cheng et al. | ................. 455/453 |
| 6,256,490 B1 | 7/2001 | Yost et al. | |
| 6,266,531 B1 | * 7/2001 | Zadeh et al. | ................. 455/453 |
| 6,275,708 B1 | * 8/2001 | Lahtinen | ...................... 455/458 |
| 6,381,458 B1 | * 4/2002 | Frodigh et al. | ............. 455/442 |
| 6,661,776 B1 | * 12/2003 | Kaufman et al. | ........... 370/234 |

FOREIGN PATENT DOCUMENTS

DE    198 36 575    2/2000

* cited by examiner

Primary Examiner—Charles N. Appiah
(74) Attorney, Agent, or Firm—Oblon, Spivak, McClelland, Maier & Neustadt, P.C.

(57) ABSTRACT

The base station comprises a number of reach times judging section which judges whether or not the number of times that the average radio resource usage volume for a prescribed time period has reached a change threshold value during a prescribed time period lies outside a reference number of times range; an allocation threshold value increasing and decreasing section which increases the allocation threshold value with respect to the radio resource usage volume at the time of a communications request from a mobile station, if the number of reach times is less than the minimum number of times of the reference number of times range, and reduces the allocation threshold value, if the number of reach times is greater than the maximum number of times of the reference number of times range; a usage volume at time of request judging section for judging whether or not the radio resource usage volume at the time of a communications request is less than an allocation threshold value; and a radio resource allocating section for allocating a new radio resource in order to establish a radio link with a mobile station, if the radio resource usage volume at the time of the communications request is less than the allocation threshold value.

6 Claims, 4 Drawing Sheets

BASE STATION AND RADIO RESOURCE ALLOCATION METHOD

BACKGROUND OF THE INVENTION

1. Field of the Invention

The present invention relates to a base station and radio resource allocation method which performs allocation of a new radio resource in order to establish a radio link with a mobile station in a mobile communications system.

2. Related Background Art

In a mobile communications system which adopts a CDMA (Code Division Multiple Access) method, when there has been a communications request from a mobile station, provided that a radio channel and hard resources (incoming/outgoing signal processing section allocated for each call) for communicating with the mobile station can be guaranteed, a base station judges whether or not the radio resource usage volume at the time of the communications request is less than an allocation threshold value (predetermined fixed value), and if this radio resource usage volume is less than the allocation threshold value, then it allocates a new radio resource and establishes a radio link with the mobile station.

However, since the base station requires a high transmission power when sending data to the mobile station, then the radio resource usage volume may vary even whilst the number of mobile stations to which communications have been established remains the same, and hence problems of the following kind may arise in the base station which allocates radio resources in the foregoing manner.

For example, even in a situation where communications with the mobile stations are actually congested, there are times when data transmission to a multiplicity of mobile stations declines temporarily and the radio resource usage volume is less than allocation threshold value, and if a communications request is received from a mobile station at such a time, then a radio resource will be allocated and as a result, the radio resource capacity will be overwhelmed.

On the other hand, even in a situation where communications are actually being conducted with relatively few mobile stations, there are times when data transmission to a multiplicity of mobile stations increases temporarily and the radio resource usage volume exceeds the allocation threshold value, and if a communications request is received from a mobile station at such a time, then a radio resource will not be allocated and hence it will not be possible to use the radio resources in an efficient manner.

SUMMARY OF THE INVENTION

The present invention was resolved in view of this situation, an object thereof being to provide abase station and radio resource allocation method whereby a new radio resource for establishing a radio link with a mobile station can be allocated in a highly efficient manner in a mobile communications system.

In order to achieve the aforementioned object, the base station relating to the present invention is a base station for establishing a radio link with a mobile station in response to a communications request from the mobile station, comprising: reach time period judging means for judging whether or not the total reach time period, being the sum total of the time periods during which the radio resource usage volume for a prescribed time period has reached a first threshold value, lies outside a reference time period range; increasing and decreasing means for increasing a second threshold value with respect to the radio resource usage volume at the time of a communications request from the mobile station, if the total reach time period is shorter than the minimum time period of the reference time period range, and decreasing the second threshold value, if the total reach time period is longer than the maximum time period of the reference time period range; usage volume at time of request judging means for judging whether or not the radio resource usage volume at the time of the communications request is less than the second threshold value; and allocating means for performing allocation of a new radio resource in order to establish a radio link with the mobile station, if the radio resource usage volume at the time of the communications request is less than the second threshold value.

According to this base station, although it is necessary for the radio resource usage volume at the time of a communications request to be less than the second threshold value, when allocating a new radio resource in order to establish a radio link with a mobile station in response to a communications request from the mobile station, the aforementioned second threshold value is increased or decreased, on the basis of the total reach time being the sum total of the time periods during which the radio resource usage volume for a prescribed time period has reached the first threshold value, in such a manner that it becomes higher when the total reach time period is shorter than a minimum time period of a reference time period range, and it becomes lower when the total reach time period is longer than a maximum time period of a reference time period range. Thereby, change in the radio resource usage volume for a prescribed time period is taken as the state of the radio resource usage volume, and this state of the radio resource usage volume is reflected dynamically in the second threshold value with respect to the radio resource usage volume at the time of a communications request from the mobile station. Therefore, it is possible, for instance, to prevent allocation of a radio resource due to a temporary drop in the radio resource usage volume in a state where communications with the mobile stations are congested, or to prevent inability to allocate a radio resource due to a temporary increase in the radio resource usage volume in a state where the radio resource usage volume is clear, and hence, new radio resources for establishing a radio link with a mobile station can be allocated in a highly efficient manner, in other words, effective use of radio resources can be achieved.

The aforementioned reference time period range means a prescribed time period range between a minimum time period and a maximum time period, and in some cases, the time period range from the minimum time period to the maximum time period may be zero.

Moreover, desirably, the increasing and decreasing means increases and decreases the second threshold value within a prescribed range. Thereby, it is possible to prevent high or very low, in the case of a continuing state of congested or free communications with the mobile stations, and the second threshold value can be restricted within a prescribed range.

Moreover, desirably, the increasing and decreasing means maintains the second threshold value, if the total reach time period lies within the reference time period range. Thereby, no increasing or decreasing of the second threshold value is performed when the total reach time period, being the sum total of the time periods during which the radio resource usage volume for a prescribed time period has reached the first threshold value, lies within the reference time period range, in other words, when the state of congestion of communications with the mobile stations is suitable, and hence the second threshold value can be stabilized.

If the inventions of the aforementioned base station are considered from the viewpoint of a radio resource allocation method, then they can be described in the following manner. These inventions are based on the same technical concepts as the aforementioned inventions relating to base stations, and the means they comprise are based on the same concepts as those described above.

In order to achieve the aforementioned object, the radio resource allocation method relating to the present invention is a radio resource allocation method implemented by a base station for establishing a radio link with a mobile station in response to a communications request from the mobile station, comprising: a reach time period judging step for judging whether or not the total reach time period, being the sum total of the time periods during which the radio resource usage volume for a prescribed time period has reached a first threshold value, lies outside a reference time period range; an increasing and decreasing step for increasing a second threshold value with respect to the radio resource usage volume at the time of a communications request from the mobile station, if the total reach time period is shorter than the minimum time period of the reference time period range, and decreasing the second threshold value, if the total reach time period is longer than the maximum time period of the reference time period range; a usage volume at time of request judging step for judging whether or not the radio resource usage volume at the time of the communications request is less than the second threshold value; and an allocating step for performing allocation of a new radio resource in order to establish a radio link with the mobile station, if the radio resource usage volume at the time of the communications request is less than the second threshold value.

Moreover, desirably, in the increasing and decreasing step, the second threshold value is increased and decreased within a prescribed range.

Moreover, desirably, in the increasing and decreasing step, the second threshold value is maintained, if the total reach time period lies within the reference time period range.

DESCRIPTION OF THE PREFERRED EMBODIMENTS

Below, a preferred embodiment of the present invention is described in detail in conjunction with the drawings. In the mobile communications system of the present embodiment, a CDMA system is adopted.

[Composition of Mobile Communications System and Base Station]

Figure 1:
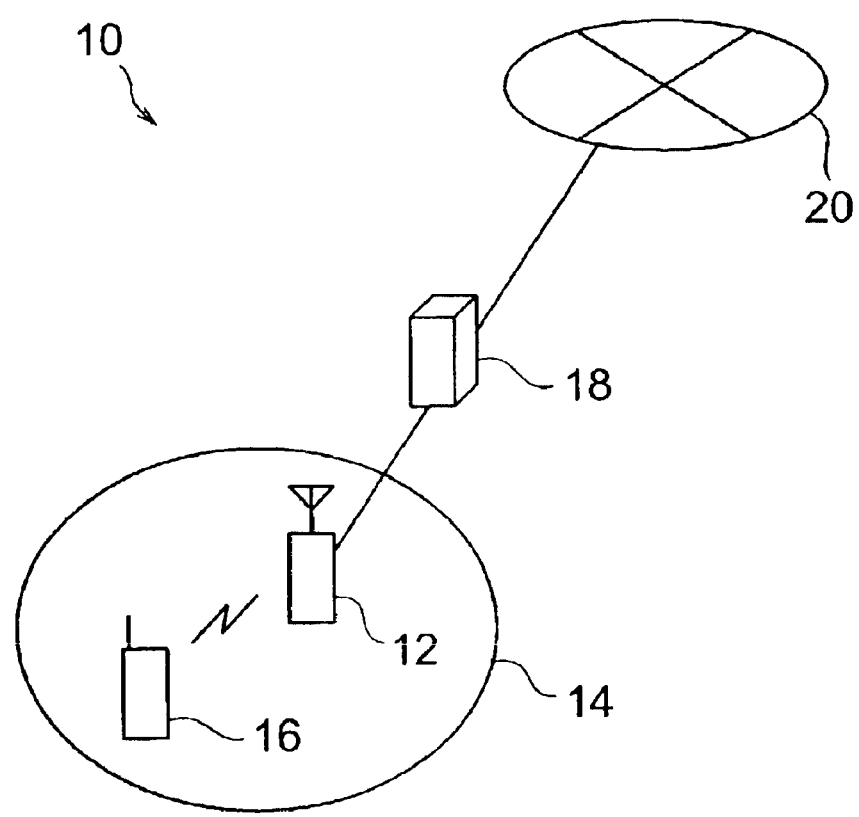
FIG. 1 is a conceptual view of a mobile communications system.

The composition of the mobile communications system 10 according to the present embodiment is now described with reference to FIG. 1. FIG. 1 is a conceptual diagram of a mobile communications system 10 according to the present embodiment. As shown in the diagram, the mobile communications system 10 comprises a base station 12, a mobile station 16 situated within a cell 14 of the base station 12, which performs communications with the base station 12 by means of a radio connection, and a base station control station 18 which is connected to the base station 12 by a wired connection and performs management of the base station 12, such as controlling the radio link connections, and the like. The base station control station 18 is connected by a wired connection to a trunk network 20.

Figure 2:
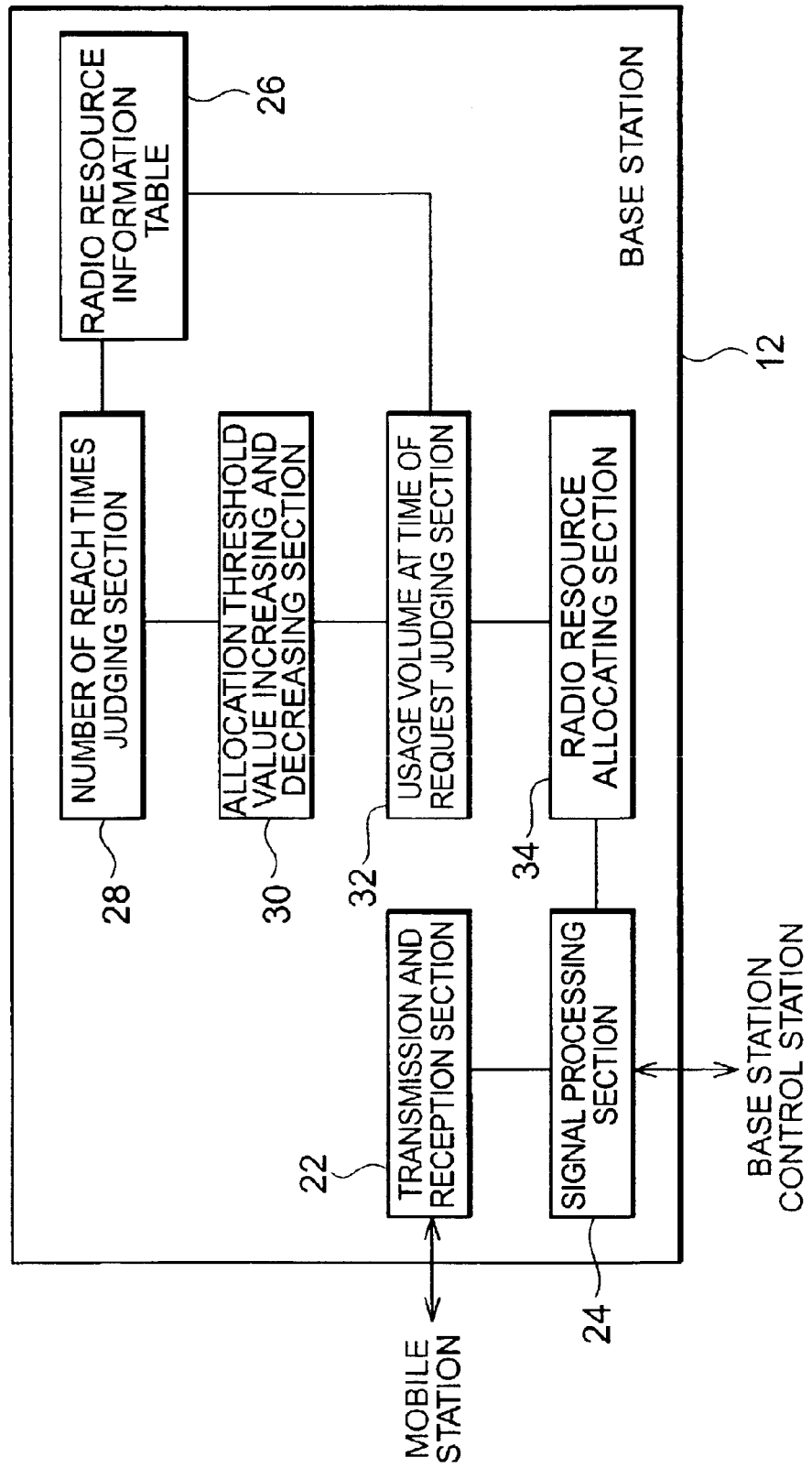
FIG. 2 is a block diagram showing the composition of a base station.

The composition of the aforementioned base station 12 is now described with reference to FIG. 2. FIG. 2 is a block diagram showing the composition of a base station 12. As shown in the diagram, the base station 12 comprises: a transmission and reception section 22, a signal processing section 24, radio resource information table 26, number of reach times judging section (reach time period judging means) 28, allocation threshold value increasing and decreasing section (increasing and decreasing means) 30, usage volume at time of request judging section (usage volume at time of request judging means) 32 and radio resource allocating section (allocating means) 34.

The transmission and reception section 22 receives communications request signals, and the like, from a mobile station 16, and send data signals, and the like, to the mobile station 16.

The signal processing section 24 comprises a control function section for performing management tasks, such as establishing and releasing radio links by transmission and reception of call control signals to and from the base station control station 18, and a transmission and reception signal processing section for performing processing tasks, such as modulating and demodulating signals sent to, or received from, the mobile station 16. The transmission and reception signal processing section is a limited hard resource allocated for each call.

The radio resource information table 26 records the change in the radio resource usage. More specifically, whenever a prescribed period of time has elapsed, it takes the average value of the radio resource usage volume during the prescribed time period, and stores this average value as an average radio resource usage volume.

The number of reach times judging section 28 takes a prescribed factor (here, for example, a factor of 6) of the prescribed time period as a prescribed time period in the radio resource information table 26, and judges whether the number of times that the average radio resource usage volume has reached a change threshold value (first threshold value), which is a predetermined fixed value, during this prescribed time period, is 0 or 1 times, 2 to 4 times, or 5 or 6 times.

The allocation threshold value increasing and decreasing section 30 increases and decreases the allocation threshold value (second threshold value) corresponding to the radio resource usage volume when a communications request is made by a mobile station 16, as described hereinafter, within a range between a minimum value and a maximum value.

Figure 3:
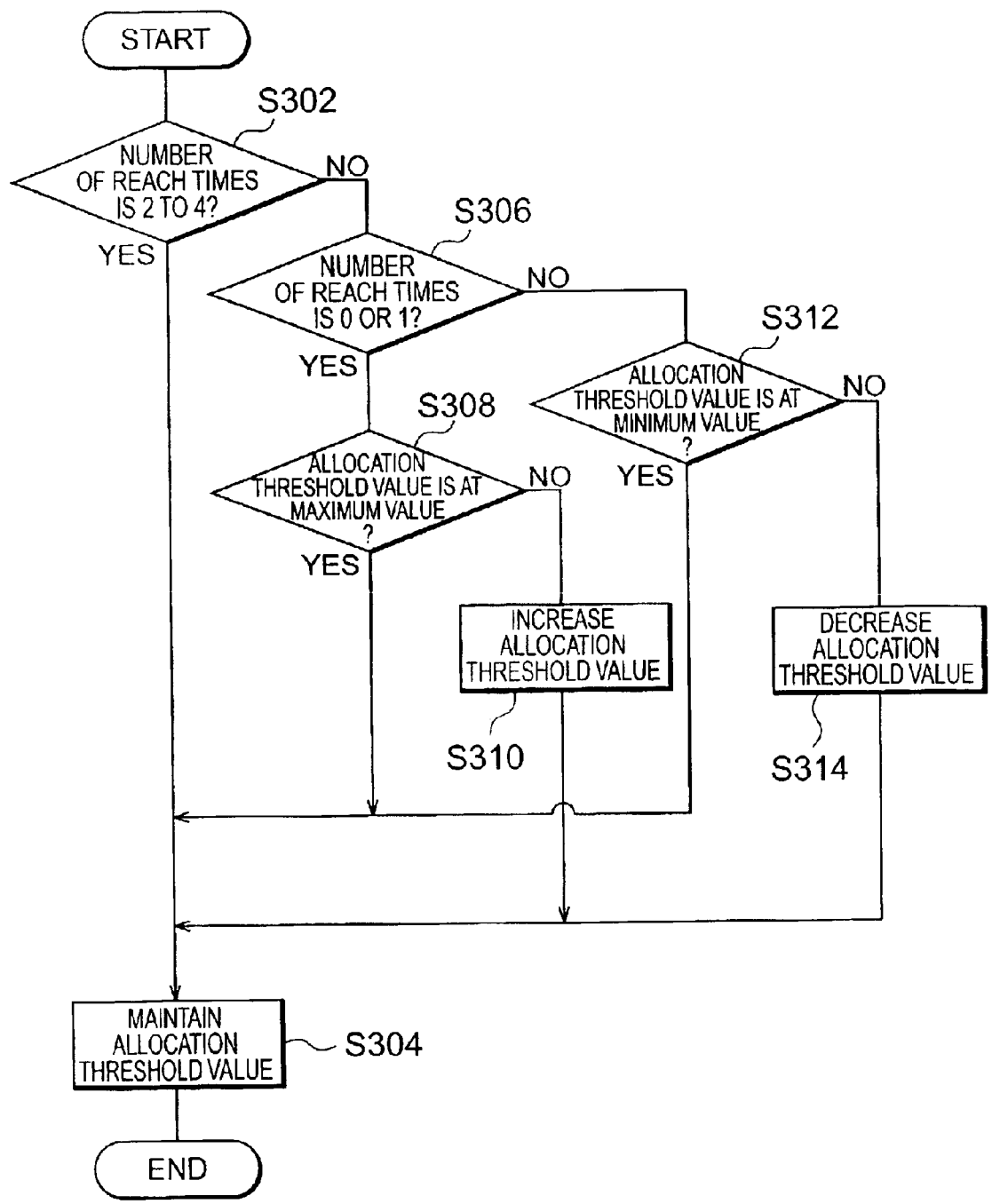
FIG. 3 is a flowchart illustrating allocation threshold value increase and decrease processing performed by an allocation threshold value increasing and decreasing section of a base station.

Here, the increase and decrease processing relating to the allocation threshold value implemented by the allocation threshold value increasing and decreasing section 30 is described with reference to the flowchart in FIG. 3. At step S302, if the number of times that the average radio resource usage volume reached the change threshold value (hereinafter, called the "number of reach times") in the aforementioned prescribed time period is between 2 to 4 times, then the procedure advances to step S304, and the current allocation threshold value is maintained without performing an increase or decrease of the allocation threshold value. On the other hand, if, at step S302, the number of reach times is not between 2 to 4 times, then the procedure advances to step S306.

At step S306, if the number of reach times is 0 or 1, then the procedure advances to step S308, and it is judged whether or not the allocation threshold value is at the maximum value. In this case, if it is at the maximum value, then the procedure advances to step S304, and the allocation threshold value is maintained. If, on the other hand, it is not at the maximum value, then the procedure advances to step S310, and the allocation threshold value is increased by a predetermined set amount.

Furthermore, if, at step S306, the number of reach times is not 0 or 1 (in other words, if the number of reach times is 5 or 6), then the procedure advances to step S312, and it is judged whether or not the allocation threshold value is at the minimum value. In this case, if it is at the minimum value, then the procedure advances to step S304, and the allocation threshold value is maintained. If, on the other hand, it is not at the minimum value, then the procedure advances to step S314, and the allocation threshold value is decreased by a predetermined set amount.

Returning to FIG. 2, the usage volume at time of request judging section 32 judges, on the basis of the information in the radio resources information table 26, whether or not the radio resources usage volume at the time of a communications request from a mobile station 16 is less than the allocation threshold value.

If the usage volume at time of request judging section 32 judges that the radio resource usage volume at the time of a communications request from the mobile station 16 was less than the allocation threshold value, then the radio resource allocating section 34 allocates a new radio resource in order to establish a radio link with the mobile station 16.

[Operation of the Base Station]

Figure 4:
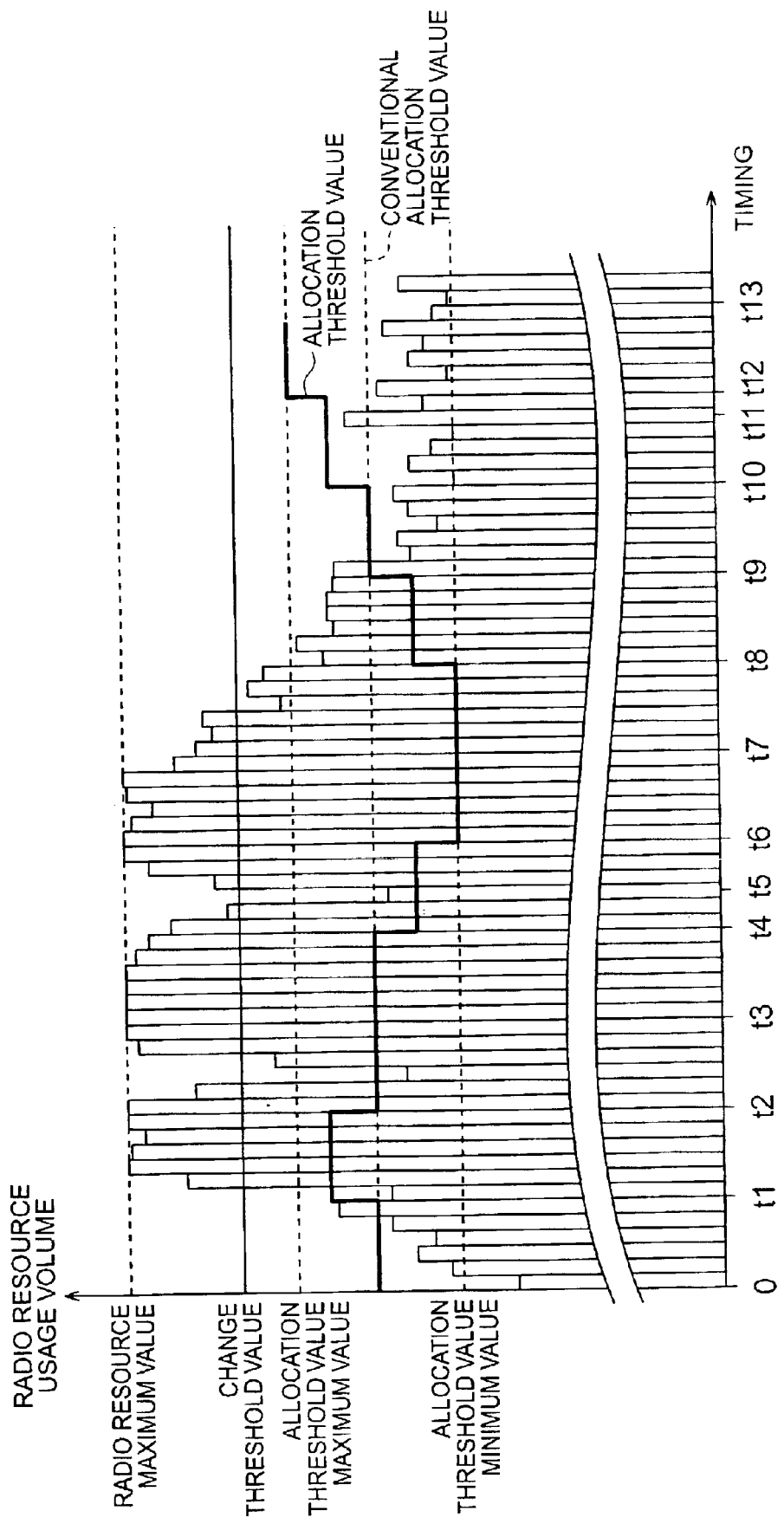
FIG. 4 is a diagram illustrating change in the radio resource usage volume recorded in a radio resource information table of the base station.

Next, the operation of the base station 12 is described with reference to FIG. 4. FIG. 4 illustrates the change in the radio resource usage volume recorded in a radio resource information table 26. In the base station 12, when allocating a new radio resource in order to establish a radio link with a mobile station 16, in response to a communications request from that mobile station 16, it must be possible to guarantee a radio channel and hard resources (the transmission and reception signal processing section allocated for each call in the signal processing section 24), and here, an operation is described by which both of these factors can be guaranteed.

At timing t1, since the number of times that the change threshold value has been reached in the previous prescribed time period (as described above, this being 6 times the prescribed time period used to calculate the average resource usage volume,) is zero, then the allocation threshold value increasing and decreasing section 30 increases the allocation threshold value by a prescribed amount. At timing t2, which is after a prescribed time period has elapsed from timing t1, the number of reach times is 5, and therefore the allocation threshold value is decreased by a prescribed amount; at timing t3, which is after a prescribed time period has elapsed from timing t2, the number of reach times is 4, and therefore the allocation threshold value is maintained; and at timing t4, which is after a prescribed time period has elapsed from timing t3 the number of reach times is 6, and therefore the allocation threshold value is decreased by a prescribed amount.

If there is a communications request from a mobile station 16 at timing t5, which is before a prescribed time period has elapsed from timing t4, then the usage volume at time of request judging section 32 judges whether or not the radio resource usage volume at timing t5 is less than the allocation threshold value. As illustrated in the diagram, since the radio resource usage volume at timing t5 exceeds the allocation threshold value, the radio resource allocating section 34 does not allocate a new radio resource in order to establish a radio link with the mobile station 16. In this case, the base station 12 should send a report to the mobile station 16 indicating that a radio link could not be established.

Next, at timing t6, which is after a prescribed time period has elapsed from timing t4, the number of reach times is 5, and hence the allocation threshold value is decreased by a prescribed amount. Since the allocation threshold value reaches its minimum value at timing t6, then although the number of reach times at timing t7, which is a after prescribed time period has elapsed from timing t6, is 6, the allocation threshold value increasing and decreasing section 30 will maintain the allocation threshold value, without decreasing it further. At timing t8, which is after a prescribed time period has elapsed from timing t7, the number of reach times is 3, and therefore the allocation threshold value is maintained; at timing t9, which is after a prescribed time period has elapsed from timing t8, the number of reach times is 0, and therefore the allocation threshold value is increased by a prescribed amount; and at timing t10, which is after a prescribed time period has elapsed from timing t9, the number of reach times is 0, and the allocation threshold value is increased by a prescribed amount.

If there is a communications request from a mobile station 16 at timing t11, which is before a prescribed time period has elapsed from t10, then the usage volume at time of request judging section 32 judges whether or not the radio resource usage volume at timing t11 is less than the allocation threshold value. As shown in the diagram, the radio resource usage volume at timing t11 is less than the allocation threshold value and consequently, the radio resource allocating section 34 allocates new radio resources in order to establish a radio link with the mobile station 16. Thereby, it is possible to establish a radio link with the mobile station 16. At timing t12, which is after a prescribed time period has elapsed from timing t10, the number of reach times is zero, and therefore the allocation threshold value is increased by a prescribed amount.

In this way, according to the base station 12, although it is necessary for the radio resource usage volume at the time of a communications request to be less than the allocation threshold value, when allocating a new radio resource in order to establish a radio link with a mobile station 16 in response to a communications request from the mobile station 16, the aforementioned allocation threshold value is increased by a prescribed amount, on the basis of the number of times in a prescribed time period that the average radio resource usage volume for a prescribed time period has reached a change threshold value, if this number of reach times is 0 or 1, and the allocation threshold value is decreased by a prescribed amount if this number of reach times is 5 or 6. Therefore, the change in the radio resource usage volume over a prescribed time period is taken as the state of the radio resource usage volume, and this state of the radio resource usage volume is reflected dynamically in the allocation threshold value with respect to the radio resource usage volume at the time of a communications request from a mobile station 16.

Thereby, if the radio resource usage volume has fallen temporarily during a situation where communications with mobile stations 16 is congested (as at timing t5 in FIG. 4), then if judgment were made on the basis of a conventional fixed-value allocation threshold value, a new radio resource would be allocated and ultimately, the radio resource capacity would be overwhelmed, but in the foregoing description, the allocation of radio resources in such circumstances is prevented. Moreover, if the radio resource usage volume has risen temporarily in a situation where communications with the mobile stations 16 are clear (as at timing t11 in FIG. 4), then if judgement were based on a conventional fixed-value allocation threshold value, no radio resource would be allocated and the radio resources would not be used effectively, but in the foregoing description, failure to allocate radio resources in such circumstances is prevented. Therefore, it is possible to allocate new radio resources in order to establish radio links with mobile stations 16 in a highly efficient manner, and consequently, radio resources can be used effectively.

Furthermore, since the allocation threshold value increasing and decreasing section 30 increases and decreases the allocation threshold value within a range between a minimum value and a maximum value, it is possible to prevent situations wherein the allocation threshold value becomes very high or very low, in the case of a continuing state of congested or free communications with the mobile stations 16, and the allocation threshold value can be restricted within a prescribed range.

Moreover, since the allocation threshold value increasing and decreasing section 30 maintains the allocation threshold value when the number of reach times is between 2 and 4, then no increasing or decreasing of the allocation threshold value is performed when the state of congestion of communications with the mobile station 16 is suitable, and hence the allocation threshold value can be stabilized.

The foregoing gave a detailed description of a preferred embodiment of the present invention, but the present invention is of course not limited to the aforementioned embodiment. For example, in the embodiment described above, the allocation threshold value was increased or decreased on the basis of the number of reach time during a prescribed time period, this being the number of times that the average radio resource usage volume for a prescribed time period reached a change threshold value, but the present invention may also perform increase or decrease of the allocation threshold value on the basis of the total reach time period, this being the sum of the time periods during which the radio resource usage volume for a prescribed time period reached a change threshold value.

As described above, according to the present invention, although it is necessary for the radio resource usage volume at the time of a communications request to be less than a second threshold value, when allocating new radio resources in order to establish a radio link with a mobile station in response to a communications request from that mobile station, this second threshold value is increased and decreased on the basis of the total reach time period being the sum total of the time periods during which the radio resource usage volume for a prescribed time period reached a first threshold value, in such a manner that it becomes higher when the total reach time period is shorter than a minimum time period of a reference time period range, and it becomes lower when the total reach time period is longer than a maximum time period of a reference time period range. Thereby, change in the radio resource usage volume for a prescribed time period is taken as the state of the radio resource usage volume, and this state of the radio resource usage volume is reflected dynamically in the second threshold value with respect to the radio resource usage volume at the time of a communications request from the mobile station. Therefore, it is possible, for instance, to prevent allocation of a radio resource due to a temporary drop in the radio resource usage volume in a state where communications with the mobile stations are congested, or to prevent inability to allocate a radio resource due to a temporary increase in the radio resource usage volume in a state where the radio resource usage volume is clear, and hence, new radio resources for establishing a radio link with a mobile station can be allocated in a highly efficient manner, in other words, effective use of radio resources can be achieved.

What is claimed is:

1. A base station for establishing a radio link with a mobile station in response to a communications request from the mobile station, comprising:

reach time period judging means for judging whether or not the total reach time period, being the sum total of the time periods during which the radio resource usage volume for a prescribed time period has reached a first threshold value, lies outside a reference time period range;

increasing and decreasing means for increasing a second threshold value with respect to the radio resource usage volume at the time of a communications request from said mobile station, if said total reach time period is shorter than the minimum time period of said reference time period range, and decreasing said second threshold value, if said total reach time period is longer than the maximum time period of said reference time period range;

usage volume at time of request judging means for judging whether or not the radio resource usage volume at the time of said communications request is less than said second threshold value; and allocating means for performing allocation of a new radio resource in order to establish a radio link with said mobile station, if the radio resource usage volume at the time of said communications request is less than said second threshold value.

2. The base station according to claim 1, wherein said increasing and decreasing means increases and decreases said second threshold value within a prescribed range.

3. The base station according to claim 1, wherein said increasing and decreasing means maintains said second threshold value, if said total reach time period lies within said reference time period range.

4. A radio resource allocation method implemented by a base station for establishing a radio link with a mobile station in response to a communications request from the mobile station, comprising:

a reach time period judging step for judging whether or not the total reach time period, being the sum total of the time periods during which the radio resource usage volume for a prescribed time period has reached a first threshold value, lies outside a reference time period range;

an increasing and decreasing step for increasing a second threshold value with respect to the radio resource usage volume at the time of a communications request from said mobile station, if said total reach time period is shorter than the minimum time period of said reference time period range, and decreasing said second threshold value, if said total reach time period is longer than the maximum time period of said reference time period range;

a usage volume at time of request judging step for judging whether or not the radio resource usage volume at the time of said communications request is less than said second threshold value; and an allocating step for performing allocation of a new radio resource in order to establish a radio link with said mobile station, if the radio resource usage volume at the time of said communications request is less than said second threshold value.

5. The radio resource allocation method according to claim 4, wherein, in said increasing and decreasing step, said second threshold value is increased and decreased within a prescribed range.

6. The radio resource allocation method according to claim 4, wherein, in said increasing and decreasing step, said second threshold value is maintained, if said total reach time period lies within said reference time period range.

* * * * *